United States Patent [19]

Arora et al.

[11] 4,332,652

[45] Jun. 1, 1982

[54] AC ETCHING OF ALUMINUM CAPACITOR FOIL

[75] Inventors: Mulk R. Arora, Williamstown; Edward J. Paquette, Adams; Allan B. McPherson, Clarksburg, all of Mass.

[73] Assignee: Sprague Electric Company, North Adams, Mass.

[21] Appl. No.: 280,659

[22] Filed: Jul. 6, 1981

Related U.S. Application Data

[63] Continuation-in-part of Ser. No. 210,940, Nov. 28, 1980, abandoned.

[51] Int. Cl.³ .............................................. C25F 3/04
[52] U.S. Cl. ............................ 204/129.75; 204/129.9
[58] Field of Search .............. 204/129.75, 129.9, 129.4

[56] References Cited

U.S. PATENT DOCUMENTS

| | | | |
|---|---|---|---|
| 2,166,990 | 7/1939 | Gray | 148/8 |
| 4,072,589 | 2/1978 | Golda | 204/129.4 |
| 4,087,341 | 5/1978 | Takahashi | 204/129.43 |
| 4,276,129 | 6/1981 | Kanzaki et al. | 204/58 |
| 4,279,714 | 7/1981 | Arora et al. | 204/129.9 |

FOREIGN PATENT DOCUMENTS 50-159430 12/1975 Japan.
52-133043 11/1977 Japan.

Primary Examiner—T. Tufariello
Attorney, Agent, or Firm—Connolly and Hutz

[57] ABSTRACT

Aluminum electrolytic capacitor foil is etched in a bath containing 0.5 to 1.8 M hydrochloric acid, 0.2 to 0.5 M aluminum chloride, 0.03 to 0.3 M phosphoric acid, and 0.05 to 0.3 M nitric acid, the molar ratio of said nitric acid to said phosphoric acid being 0.3–5, while subjected to the action of alternating current at 28° to 45° C.

5 Claims, 1 Drawing Figure

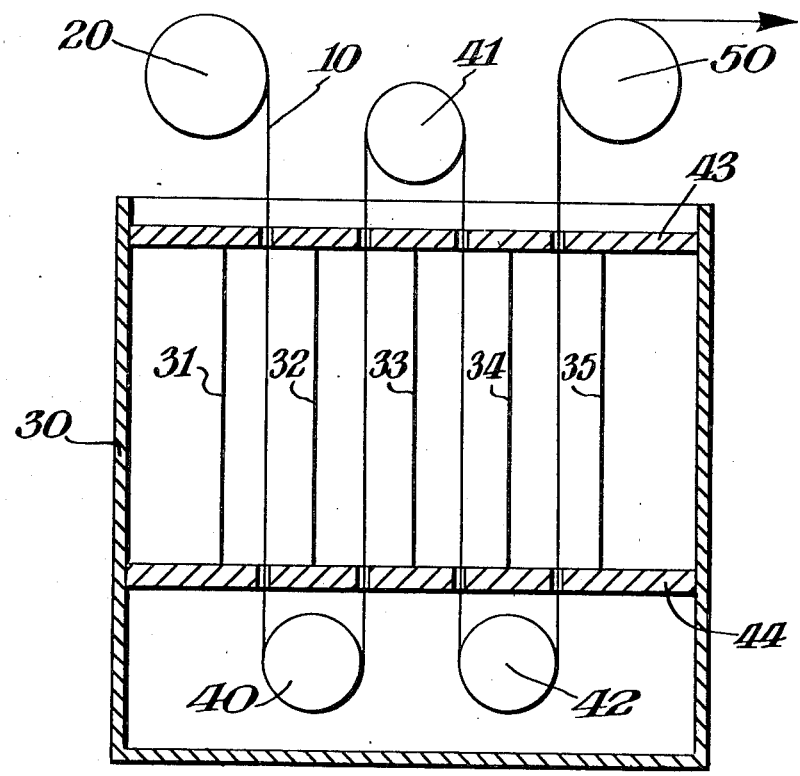

AC ETCHING OF ALUMINUM CAPACITOR FOIL

CROSS REFERENCE TO RELATED APPLICATION

This application is a continuation-in-part of application Ser. No. 210,940, filed Nov. 28, 1980.

BACKGROUND OF THE INVENTION

This invention relates to AC etching of aluminum foil for electrolytic capacitors, and in particular to a process utilizing alternating current and a chloride electrolyte bath containing phosphoric and nitric acids.

AC etching has been used to produce aluminum articles such as lithographic plates and capacitor foil. It also has been used to electropolish aluminum articles prior to metal plating.

The prior art has discussed the difficulties in obtaining an even or uniform etch structure and has overcome these difficulties in a variety of ways, e.g., interrupting the etch process to apply protective coatings, carrying out the etch process in stages of differing degrees of aggressiveness, and using additives in the electrolyte bath to control pit size or to increase mechanical strength of the foil.

Another problem has been to prevent the precipitation of aluminum hydroxide, formed during etching, on or into the etched surfaces.

The resolution of these problems has led to prior art processes in which the etch conditions are carefully controlled to provide the desired increase in surface area and, particularly for capacitor foil, with little change in mechanical strength. Such a process is described by M. Arora and J. J. Randall, Jr., in copending application Ser. No. 187,241, filed Sept. 15, 1980, that utilizes a phosphate in the hydrochloric etch bath. Another such process is described by M. Arora, J. J. Randall, Jr. and W. J. Bernard in copending application Ser. No. 187,271 filed Sept. 15, 1980, that utilizes a phosphate and chromate in the hydrochloric acid etch bath. Still another process is described by M. Arora in copending application Ser. No. 188,637, filed Sept. 19, 1980, that utilizes an intermittent etch scheme.

SUMMARY OF THE INVENTION

The present invention overcomes the environmental concerns about the prior art use of the chromate, while improving on the results obtained from the prior art use of the phosphate only.

A feature of this invention is the provision of a process of etching aluminum capacitor foil which utilizes AC current to give a uniform etch structure while maintaining the strength of the foil. Another feature is the provision of a process which also provides a greater etch pit density and size than prior art processes.

The above objectives are accomplished in accordance with this invention by using an etchant solution containing hydrochloric acid, aluminum chloride, nitric acid and phosphoric acid at 28° to 45° C., alternating current of 12 to 30 Hz frequency, and anodic current density of 1.0 to 3.0 A/in$^2$.

The concentration of the hydrochloric acid in the etchant is 0.5 to 1.8 M to provide strongly acidic conditions that prevent the formation and precipitation of aluminum hydroxide on the foil. The concentration of the aluminum chloride is 0.2 to 0.5 M to initially catalyze the reaction, especially with fresh etchant solution. The concentration of nitric acid is 0.05 to 0.3 M to give the desired uniformity and etch density (number of pits/unit area of foil). It is postulated that the phosphoric acid in concentrations of 0.03 to 0.3 M serves to passivate sites that have already been started, so that etching will proceed at different sites, giving the desired etch density, rather than concentrating at started sites. The phosphoric acid also appears to minimize the polishing effect and to maintain the etch structure. When phosphoric acid is present, capacitance is increased by about 30% over that obtained with a hydrochloric-nitric acid etchant alone.

The current density is maintained at 1.0 to 3.6 A/in$^2$ to provide the desired number of sites. If the current density is too low, i.e., below 1.0 A/in$^2$, there will not be the desired number of sites; if too high, i.e., above 3.6 A/in$^2$, the etch structure becomes fragile leading to a smooth polished surface rather than an etched one and capacitance decreases. Foil is also thinned in the latter case. Preferably, the current density is 1.5–2.25 A/in$^2$.

The frequency of the alternating current is maintained at 12 to 30 Hz, preferably 16 to 26 Hz, as this frequency with the electrolyte of this invention gives etched foil with optimum capacitance. The voltage, a function of current density and etch cell design, is ±7 V. With a different cell design, the voltage will differ also.

The temperature of the etchant solution is maintained at 28° to 45° C. to provide pores of suitable size and density. Lower temperatures result in fewer and larger pores, while higher temperatures give more pores but narrower pits and lower capacitance.

BRIEF DESCRIPTION OF THE DRAWING

The sole FIGURE shows foil being etched by the process of the present invention.

DESCRIPTION OF THE PREFERRED EMBODIMENTS

Aluminum foil 10 is passed over roll 20 into etching tank 30 between insulated electrodes 31 and 32, under roll 40 and between electrodes 32 and 33, over roll 41 and between electrodes 33 and 34, under roll 42 and between electrodes 34 and 35, and out of tank 30 and over roll 50. The electrodes are carried by insulated frames 43 and 44 that have openings for passage of foil 10. More electrodes and rolls may be used than shown. In fact, it is more efficient to use more electrodes, but enough have been shown to illustrate the invention.

Because the electrodes 31, 32, 33, 34 and 35 are mounted in insulated frames 43 and 44, the alternating current passed through them is forced to pass through the foil and not through the main body of etchant solution. In this way, the foil is electrochemically etched during the time the foil passes between a pair of electrodes and not electrochemically etched when outside the frame, e.g., between frame 44 and roll 40.

The etched foil obtained by the method of the present invention retains a solid metallic core that gives good mechanical properties and low-temperature capacitance retention. There is an interrelationship among etchant composition and concentration, temperature, AC frequency, and current density, with the last being the least crucial, that gives the desired results, i.e. good capacitance and mechanical properties, not just etchant composition and concentration alone.

In the examples below, soft foil of 99.99% purity was used. Hard foil can be etched by this process, as can foil of different purity, but satisfactory capacitance is obtained without resorting to hard foil and the processing problem associated therewith.

The etch scheme used is that described by M. Arora in the above-identified copending application Ser. No. 188,637 filed Sept. 19, 1980, which is incorporated by reference herein. Since the foil is etched intermittently, the total charge passed to the foil is a more meaningful unit than etching time.

EXAMPLE 1

Soft aluminum foil of 2.9 mil initial thickness was etched intermittently using alternating current and as etchant electrolyte a mixture of hydrochloric acid, phosphoric acid, aluminum chloride, and nitric acid.

In Table 1a, electrolyte composition and molar concentration, M (moles/liter), is given for each run.

TABLE 1a

| Run | HCl | AlCl$_3$ | H$_3$PO$_4$ | HNO$_3$ |
|---|---|---|---|---|
| 1 | 1.2 | 0.35 | 0.11 | 0.116 |
| 2 | 1.3 | 0.30 | 0.14 | 0.154 |
| 3 | 1.6 | 0.25 | 0.11 | 0.04 |
| 4 | 1.3 | 0.25 | 0.11 | 0.31 |
| 5 | 1.3 | 0.30 | 0.08 | 0.154 |
| 6 | 1.4 | 0.40 | 0.20 | 0.195 |
| 7 | 1.5 | 0.35 | 0.03 | 0.154 |
| 8 | 1.5 | 0.35 | 0.11 | 0.154 |
| 9 | 1.5 | 0.35 | 0.11 | 0.154 |
| 10 | 1.6 | 0.35 | 0.11 | 0.154 |

In Table 1b, etching conditions and results are presented. The temperature is degrees Celsius (°C.), the total charge passed is in coulombs/in$^2$ of foil, alternating current frequency is in Hertz (Hz), anodic current density is in amperes/in$^2$ of foil (A/in$^2$), thickness is foil thickness in mils after etching, and 10 V and 30 V capacitance is capacitance/unit area ($\mu$F/in$^2$).

TABLE 1b

| Run | Temp. | Charge passed | Freq. | Current density | Thickness | Wt. loss % | Capacitance 10V | Capacitance 30V |
|---|---|---|---|---|---|---|---|---|
| 1 | 32 | 500 | 25 | 2.6 | 2.80 | 33.3 | 270 | 75.9 |
| 2 | 36 | 520 | 25 | 2.6 | 2.87 | 34.4 | 338 | 109 |
| 3 | 32 | 520 | 25 | 2.6 | 2.82 | 34.2 | 267 | 90 |
| 4 | 32 | 470 | 25 | 2.6 | 2.84 | 32.4 | 233 | 65.2 |
| 5 | 36 | 520 | 25 | 2.6 | 2.87 | 33.3 | 333 | 103.5 |
| 6 | 40 | 616 | 30 | 2.8 | 2.82 | 40.8 | 346 | 102.2 |
| 7 | 28 | 465 | 25 | 1.94 | 2.85 | 30.0 | 302 | 87.7 |
| 8 | 32 | 500 | 25 | 1.75 | 2.85 | 32.7 | 336 | 100 |
| 9 | 32 | 450 | 20 | 1.94 | 2.82 | 34.5 | 307 | 77.5 |
| 10 | 32 | 500 | 25 | 1.55 | 2.83 | 30.0 | 328 | 90.3 |

EXAMPLE 2

Soft aluminum foil was etched using the following electrolytes and the following conditions. Electrolyte component concentration is in moles/liter, weight loss is in percent, and thickness after etching is in mils.

TABLE 2

| HCl | H$_3$PO$_4$ | HNO$_3$ | AlCl$_3$ | A/in$^2$ | Hz | °C. | Wt. loss | Thickness | Capacitance 10V | Capacitance 30V |
|---|---|---|---|---|---|---|---|---|---|---|
| 1.15 | 0.11 | 0.154 | 0.26 | 2.90 | 26 | 34 | 30.1 | — | 306 | 90.9 |
| 0.5 | 0.114 | 0.154 | 0.39 | 1.75 | 26 | 33 | 31.8 | 2.89 | 334 | 94.9 |
| 0.75 | 0.112 | 0.154 | 0.4 | 1.0 | 16.4 | 33 | 28.7 | 2.90 | 297 | 90.0 |
| 0.85 | 0.11 | 0.11 | 0.44 | 1.5 | 12.0 | 35 | 35.0 | 2.80 | 239 | 65.3 |
| 0.75 | 0.112 | 0.154 | 0.40 | 1.5 | 16.4 | 33 | 35.3 | 2.85 | 370 | 107.6 |
| ↓ | ↓ | ↓ | ↓ | 1.5 | 20.0 | 33 | 33.5 | 2.84 | 385 | 114.2 |
| ↓ | ↓ | ↓ | ↓ | 1.5 | 26.0 | 33 | 29.8 | 2.86 | 360 | 103.3 |
| ↓ | ↓ | ↓ | ↓ | 1.75 | 16.4 | 33 | 33.8 | 2.87 | 357 | 105.4 |
| ↓ | ↓ | ↓ | ↓ | 1.75 | 20.0 | 33 | 33.2 | 2.89 | 379 | 115.7 |
| ↓ | ↓ | ↓ | ↓ | 1.75 | 26.0 | 33 | 32.6 | 2.87 | 379 | 113.0 |

An added advantage of the electrolyte of this invention is that the concentration of the constituents can vary somewhat without adversely affecting results. The preferred concentration of the hydrochloric acid is 0.7 to 1.5 M, with 0.5 M as the lower limit below which not enough etching took place and 1.8 M the upper limit above which macrothinning of the foil took place.

Some phosphoric acid is needed, with 0.03 M being the lower limit. However, if too much phosphoric acid is present, above about 0.3 M, capacitance decreases. The preferred amount is about 0.11 M.

The presence of nitric acid is critical. Without it, capacitance is about one-third lower and weight loss is 4-5% higher leading to poorer mechanical properties of the etched foil. The use of nitric acid in a nitric:hydrochloric acid ratio of 1:3-12 permits etching at lower temperatures and permits a wider latitude in current density and concentration of electrolyte components, particularly hydrochloric acid and aluminum ion, without adversely affecting capacitance, foil thickness, and weight loss. With lower nitric acid concentrations, the temperature is increased up to 45° C. to get the desired results, but below about 0.05 M nitric acid capacitance begins to fall off. Above 0.3 M nitric acid, capacitance also falls off. The preferred amount is about 0.15 M.

The functions of the nitric and phosphoric acids are to give the desired uniformity of the etch structure. It is believed that the phosphoric acid is more important on the foil surface and that the nitric acid is more important in the tunnels or pits. Thus, it is desirable not to change their concentrations in the electrolyte and particularly relative to each other.

Because both size and number of tunnels (etch sites) are important, there is a synergistic, critical relationship between the nitric and phosphoric acid concentrations. If the nitric acid concentration is too low, the same tunnels will grow instead of new tunnels. If too high, the tunnels will be passivated and too shallow. If the phosphoric acid concentration is too low, there will not be enough surface passivation; if too high, the surface will be passivated too much for new etch sites (tunnels) to form. For optimum capacitance, the molar ratio of nitric:phosphoric acid is 0.3–5. If it is below about 0.3, there will be not enough tunnel passivation and too much surface protection so the tunnels keep growing but there will be fewer of them. If the ratio is above about 5, the tunnels will be protected but the surface will not be, leading to chemical polishing of the surface and loss of capacitance and/or tunnels of small diameter.

As is known, aluminum chloride initially catalyzes the etching reaction, and for that reason at least 0.2 moles/liter must be present initially. Higher concentrations of aluminum ion are preferred, as electrolyte recycle and recovery rate are a function of aluminum ion concentration. However, above about 0.5 M aluminum ion concentration, the character of the etching changes to a uniform currosion rather than preferential tunnel etching. Therefore, 0.5 M aluminum ion concentration is the upper limit with about 0.35 M preferred.

Frequency and current density parameters are influenced by machine design. In the laboratory, optimum current density was found to be between 1.5 A/in$^2$ and 3.0 A/in$^2$, while pilot plant equipment was operated at up to 3.6 A/in$^2$. The higher current densities are particularly useful for etching cathode foil.

In the pilot plant, the dynamic motion of the foil apparently loosens etched particles and removes them mechanically exposing fresh reactive foil surface. Thus, a milder etchant, i.e., less hydrochloric acid, is needed in the pilot plant than in the laboratory to minimize chemical polishing.

Frequency also controls the number and size of the etch sites; with high frequency, many small sites are formed while at lower frequencies, there are fewer but larger sites. High frequency also means many short anodic-cathodic cycles per second. With a highly passivating electrolyte, many short cathodic cycles are needed. With a weaker passivating electrolyte, fewer but longer cathodic cycles/second are desired. Optimum frequency was found to be 25 Hz in the laboratory with 30 and 30 Hz as the lower and upper limits. However, in the pilot plant, lower frequencies were found desirable with 12 Hz as the lower limit.

Since the surface is more reactive and a milder etchant is required, a lower frequency is also desirable to give longer cathodic or passivating cycles. While the same result could have been obtained by increasing the concentrations of the phosphoric and nitric acids, it was preferred to change the frequency.

Nevertheless, the presence of relatively small but definite amounts of both phosphoric and nitric acids in a hydrochloric acid etch solution gives an etched foil with higher capacitance and lower weight loss than are obtained with the hydrochloric acid with either alone.

What is claimed is:

1. A process for AC electrolytic etching of aluminum capacitor foil comprising passing the foil between electrodes supplied with alternating current at a frequency of 12 to 30 Hz in a bath comprising hydrochloric acid, nitric acid, phosphoric acid, and aluminum chloride at 28° to 45° C., the molar ratio of said nitric to said phosphoric acid being 0.3–5.

2. A process according to claim 1 wherein the molar ratio of nitric acid to hydrochloric acid is 1:3–12.

3. A process according to claim 1 wherein said bath comprises 0.5 to 1.8 M hydrochloric acid, 0.05 to 0.3 M nitric acid, 0.03 to 0.3 M phosphoric acid, and 0.2 to 0.5 M aluminum chloride.

4. A process according to claim 1 wherein the anodic current density is 1.0 to 3.6 A/in$^2$.

5. A process according to claim 1 wherein the concentration of the hydrochloric acid is 0.7 to 1.5 M, the concentration of the nitric acid is about 0.15 M, the concentration of the phosphoric acid is about 0.11 M, the concentration of the aluminum chloride is about 0.25 to 0.4 M, the temperature is 32° to 38° C., and the frequency of the alternating current is about 20 to 26 Hz.

* * * * *